(12) United States Patent
Tung et al.

(10) Patent No.: US 10,887,058 B2
(45) Date of Patent: Jan. 5, 2021

(54) SIGNAL DETECTOR AND SIGNAL DETECTION METHOD

(71) Applicant: Realtek Semiconductor Corporation, Hsinchu (TW)

(72) Inventors: Ming-Hui Tung, Hsinchu (TW); Wei-Chi Chen, Taichung (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 0 days.

(21) Appl. No.: 16/430,536

(22) Filed: Jun. 4, 2019

(65) Prior Publication Data
US 2020/0169360 A1 May 28, 2020

(30) Foreign Application Priority Data
Nov. 22, 2018 (TW) .............................. 107141736 A

(51) Int. Cl.
*H04B 1/20* (2006.01)
*H04L 1/20* (2006.01)
*H04B 1/16* (2006.01)

(52) U.S. Cl.
CPC . *H04L 1/20* (2013.01); *H04B 1/16* (2013.01)

(58) Field of Classification Search
CPC ................................... H04L 1/20; H04B 1/16
USPC ....................................................... 375/227
See application file for complete search history.

(56) References Cited

U.S. PATENT DOCUMENTS

| | | | |
|---|---|---|---|
| 7,899,649 B1* | 3/2011 | Wong ........................ | H03K 5/19 702/189 |
| 8,090,971 B2* | 1/2012 | Sarmento ................ | H04L 25/14 375/219 |
| 2013/0003907 A1* | 1/2013 | Wenske ................... | H04L 7/033 375/373 |
| 2018/0302264 A1* | 10/2018 | Liao .................. | H04L 25/03273 |

FOREIGN PATENT DOCUMENTS

TW       201601040 A       1/2016

* cited by examiner

*Primary Examiner* — Helene E Tayong
(74) *Attorney, Agent, or Firm* — Locke Lord LLP; Tim Tingkang Xia, Esq.

(57) ABSTRACT

A signal detector includes oversampling circuitries and a detector circuitry. The oversampling circuitries are configured to receive a first signal and a second signal from a channel, and to sequentially sample the first signal and the second signal according to a plurality of clock signals to generate a plurality of signal difference values, and to compare the plurality of signal difference values with a reference difference value, in order to generate a plurality of detection signals. The detector circuitry is configured to generate a noise indication signal according to the plurality of detection signals, in order to indicate whether the first signal and the second signal are noises.

20 Claims, 4 Drawing Sheets

SIGNAL DETECTOR AND SIGNAL DETECTION METHOD

CROSS-REFERENCE TO RELATED APPLICATION

This application claims priority to Taiwan Application Serial Number 107141736, filed Nov. 22, 2018, which is herein incorporated by reference.

BACKGROUND

Technical Field

The present disclosure relates to a signal detector and a signal detection method. More particularly, the present disclosure relates to a signal detector and a signal detection method for distinguishing signals received from a channel.

Description of Related Art

In high-speed applications, intersymbol interference (ISI) has become a common issue. The ISI may decrease the accuracy of data, and may cause part circuits in the system to perform wrong operations due to errors in receiving data.

SUMMARY

Some aspects of the present disclosure are to provide a signal detector that includes a plurality of oversampling circuitries and a detector circuitry. The plurality of oversampling circuitries are configured to receive a first signal and a second signal from a channel, and to sequentially sample the first signal and the second signal according to a plurality of clock signals to generate a plurality of signal difference values, and to compare the plurality of signal difference values with a reference difference value, in order to generate a plurality of detection signals. The detector circuitry is configured to generate a noise indication signal according to the plurality of detection signals, in order to indicate whether the first signal and the second signal are noises.

Some aspects of the present disclosure are to provide a signal detection method that includes the following operations: sequentially sampling a first signal and a second signal from a channel according to a plurality of clock signals to generate a plurality of signal difference values, and comparing the plurality of signal difference values with a reference difference value, in order to generate a plurality of detection signals; and generating a noise indication signal according to the plurality of detection signals, in order to indicate whether the first signal and the second signal are noises.

As described above, the signal detector and signal detection method of embodiments of the present disclosure are able to distinguish signals received from the channel by oversampling, in order to prevent signals from being determined as noises by mistake due to ISI.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present embodiments. Furthermore, for simplifying the drawings, some of the conventional structures and elements are shown with schematic illustrations.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other.

In this document, the term "circuitry" may indicate a system formed with one or more circuits. The term "circuit" may indicate an object, which is formed with one or more transistors and/or one or more active/passive elements based on a specific arrangement, for processing signals.

Figure 1:
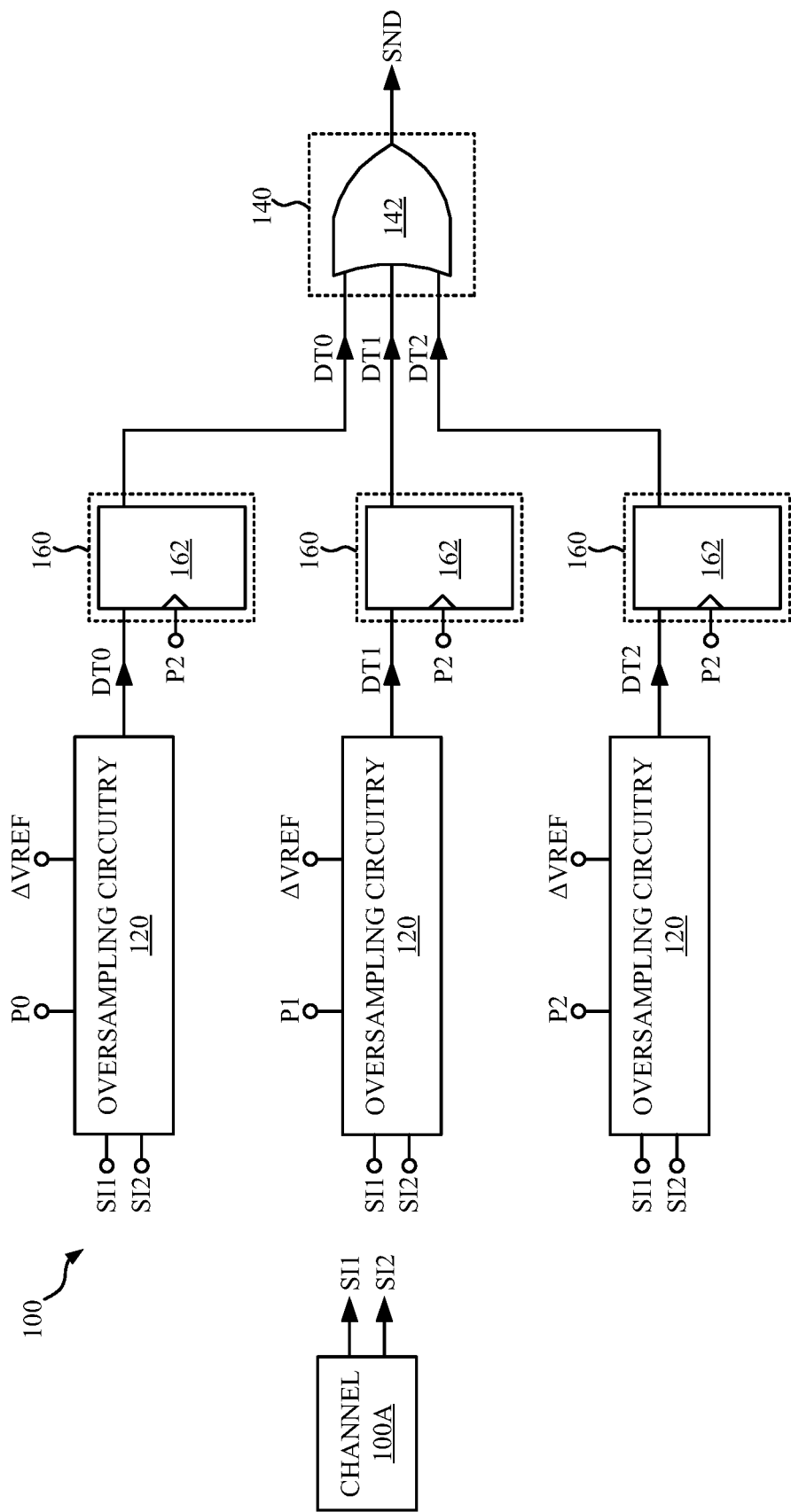
FIG. 1 is a schematic diagram of a signal detector according to some embodiments of the present disclosure.

Reference is made to FIG. 1. FIG. 1 is a schematic diagram of a signal detector 100 according to some embodiments of the present disclosure. In some embodiments, the signal detector 100 may be applied to a high-speed transmission system, in order to determine whether a received signal is data or noise, but the present disclosure is not limited thereto.

In some embodiments, the signal detector 100 includes oversampling circuitries 120 and a detector circuitry 140. The oversampling circuitries 120 receive a signal SI1 and a signal SI2 via a channel 100A. In some embodiments, the signal SI1 and the signal SI2 may be differential signals, and carry with specific data. In some embodiments, the channel 100A may be a signal path between circuit boards or a signal wire connected to a serial transmission system, but the present disclosure is not limited thereto.

The oversampling circuitries 120 sample the signal SI1 and the signal SI2 according to clock signals P0-P2, in order to generate signal difference values (e.g., SD0-SD2 in FIG.

2). The oversampling circuitries 120 further compare the signal difference values with a reference difference value ΔVREF, in order to generate detection signals DT0-DT2.

The detector circuitry 140 is coupled to the oversampling circuitries 120, in order to receive the detection signals DT0-DT2. The detector circuitry 140 is configured to generate a noise indication signal SND according to the detection signals DT0-DT2, in order to indicate whether the received signals SI1 and SI2 are noises. In some embodiments, the detector circuitry 140 may be implemented with an OR gate circuit, but the present disclosure is not limited thereto. In some embodiments, the noise indication signal SND may be utilized to determine whether to activate a power-saving mechanism of the system.

In some embodiments, the signal detector 100 may further include synchronous output circuitries 160. The synchronous output circuitries 160 are coupled between the oversampling circuitries 120 and the detector circuitry 140. The synchronous output circuitries 160 respectively receive the detection signals DT0-DT2, and respectively output the received detection signals DT0-DT2 to the detector circuitry 140 according to the last clock signal P2 of the clock signals P0-P2. In some embodiments, the synchronous output circuitry 160 may be implemented with a D-type flip flop circuit 162. In some embodiments, the D-type flip flop circuit 162 may be configured to be negative-edge triggered, in order to output the received detection signals DT0-DT2 to the detector circuitry 140 in response to a falling edge of the clock signal P2 (e.g., falling edge FE1 in FIG. 3). The above arrangement of the synchronous output circuitry 160 is given for illustrative purposes, and the present disclosure is not limited thereto. Various types of the synchronous output circuitry 160 are within the contemplated scope of the present disclosure.

The following paragraphs are given to provide implementations or embodiments of the above circuits, but the present disclosure is not limited to these embodiments.

Figure 2:
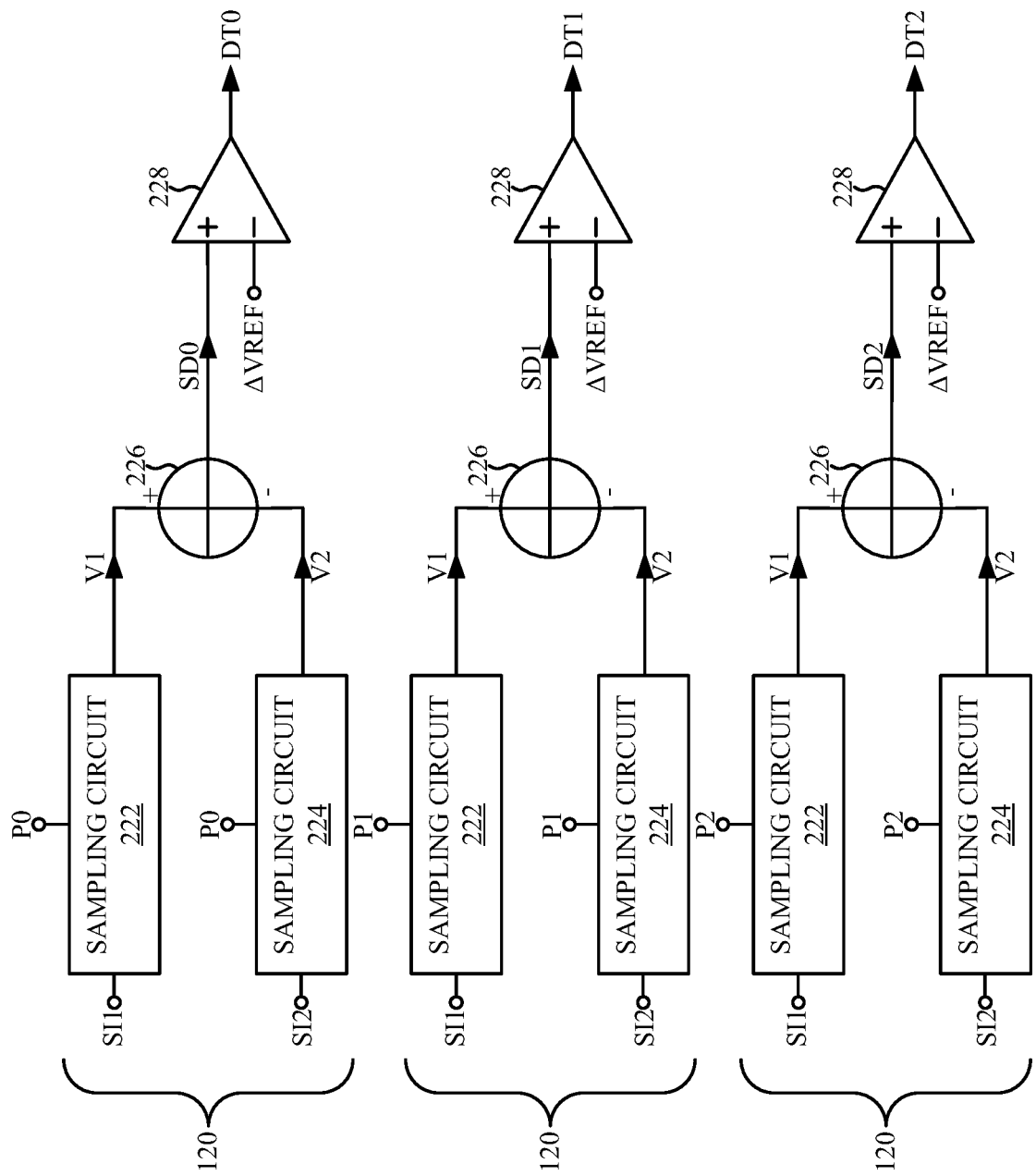
FIG. 2 is a circuit diagram of the oversampling circuitries in FIG. 1 according to some embodiments of the present disclosure.

Reference is made to FIG. 2. FIG. 2 is a circuit diagram of the oversampling circuitries 120 in FIG. 1 according to some embodiments of the present disclosure. For ease of understanding, like elements in FIGS. 1-2 are designated with the same reference numbers.

Each oversampling circuitry 120 includes sampling circuits 222 and 224, an arithmetic circuit 226, and a comparator circuit 228. For ease of illustration, the following descriptions are given with reference to examples where the oversampling circuitry 120 in FIG. 2 is operated according to the clock signal P0. It should be understood that the following operations and configurations can be applied to other oversampling circuitries 120, and thus the repetitious description is not further given.

The sampling circuit 222 samples the signal SI1 according to the corresponding clock signal P0 of the clock signals P0-P2, in order to generate a signal value V1. The sampling circuit 224 samples the signal SI2 according to the corresponding clock signal P0, in order to generate the signal value V2. In some embodiments, the sampling circuits 222 and 224 may be implemented with switched-capacitors circuits, but the present disclosure is not limited thereto.

The arithmetic circuit 226 is coupled to the sampling circuits 222 and 224, in order to receive the signal values V1 and V2. In some embodiments, the arithmetic circuit 226 is configured to calculate a difference value between the signal values V1 and V2, in order to generate a corresponding signal value SD0 of the signal values SD0-SD2. In some embodiments, the arithmetic circuit 226 may be implemented with a subtractor, but the present disclosure is not limited thereto.

The comparator circuit 228 is coupled to the arithmetic circuit 226, in order to receive the corresponding signal value SD0. In some embodiments, the comparator circuit 228 compares the corresponding signal value SD0 with the reference difference value ΔVREF in order to generate the corresponding detection signal DT0 of the detection signals DT0-DT2, and transmits the same to the corresponding synchronous output circuitry 160 in FIG. 1. For example, when the signal difference value is greater than the reference difference value ΔVREF, the comparator circuit 228 outputs the detection signal DT0 having a logic value of 1. Under this condition, the signals SI1 and SI2 received according to the clock signal P0 can be determined as data. Alternatively, when the difference value is less than or equal to the reference difference value ΔVREF, the comparator circuit 228 outputs the detection signal DT0 having a logic value of 0.

Figure 3:
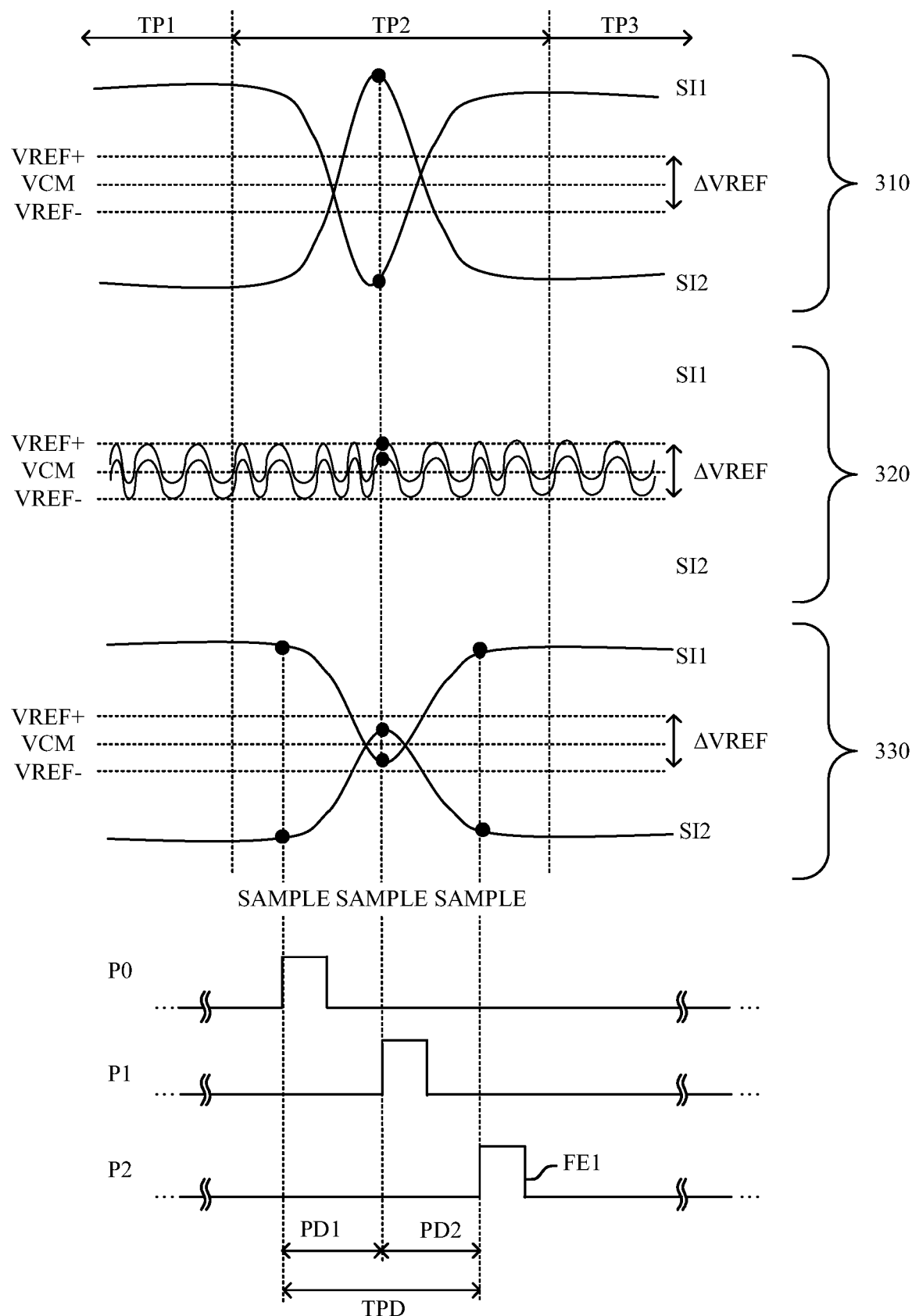
FIG. 3 is a waveform diagram of the signals and the clock signals in FIG. 1 according to some embodiments of the present disclosure.

Reference is made to FIG. 3. FIG. 3 is a waveform diagram of the signals SI1 and SI2 and the clock signals P0-P2 in FIG. 1 according to some embodiments of the present disclosure. For ease of understanding, like elements in FIGS. 1 and 3 are designated with the same reference number.

In FIG. 3, a voltage difference between reference voltages VREF+ and VREF− is the reference difference value ΔVREF, a common mode voltage VCM is the common mode voltage between the signals SI1 and SI2, in which when a difference value between the signals SI1 and SI2 is greater than the reference difference value ΔVREF, the signal SI1 and the signal SI2 are considered to carry with specific data. Alternatively, when the difference value between the signals SI1 and SI2 is less than the reference difference value ΔVREF, the signal SI1 and the signal SI2 are considered to be not carry with specific data. Under this condition, the signals SI1 and SI2 are considered as noises.

For example, if the sampling is made at a center of a bit interval (for example, in a bit interval TP2, sampling is made according to a rising edge of the clock signal P1), as shown by a waveform 310, the difference value between the signals SI1 and SI2 is greater than the reference difference value ΔVREF, the signals SI1 and SI2 carry with specific data, which has bits of 1, 0, and 1 during bit intervals TP1, TP2, and TP3 respectively. Alternatively, as shown by a waveform 320, if the difference value between the signals SI1 and SI2 is apparently less than or equal to the reference difference value ΔVREF, the signals SI1 and SI2 are determined to be noises under this condition.

In some cases, as shown by a waveform 330, since intersymbol interference (ISI) is introduced from the channel 100A, a distortion of the signals SI1 and SI2 is occurred during the bit interval TP2. In some related approaches, only one sampling is made during one bit interval (e.g., bit interval TP2) of an signal to be detected (e.g., sampled only according to the clock signal P1). In the case shown by the waveform 330, these approaches may determine the signals SI1 and SI2 as noises by mistake.

In some embodiments, phase difference PD1 and PD2 are sequentially arranged within the clock signals P0-P2. In some embodiments, a total interval TPD of the phase differences PD1 and PD2 is configured to be less than or equal to a bit interval of the signal SI1 or SI2 (e.g., the bit interval TP2). In some embodiments, a number of phase differences, which are between the clock signals P0-P2 and within one bit interval of the signal SI1 or SI2, is more than or equal to 1. In other words, the signal SI1 or SI2 is sequentially sampled at least twice in each bit interval. For example, as shown in FIG. 3, the sampling circuits 222 of the oversampling circuitry 120 may sequentially sample the signal SI1 according to the rising edges of the clock signal P0, P1, and P2.

Compared with the above approaches, with such arrangement, the signal SI1 or SI2 is sequentially sampled at least twice in each bit interval. Accordingly, the detector circuitry 140 is able to determine whether the signal SI1 or SI2 is noise according to signal values that are sampled at different timings. As a result, the signals SI1 and SI2 can be prevented from being determined as noises due to the ISI.

For example, if the detection signals DT0-DT2 are all logic values of 0, it indicates that the signal difference values SD0-SD2 sampled at different timings are all less than the reference difference value ΔVREF. Under this condition, the detector circuitry 140 outputs the noise indication signal SND having the logic value of 0, in order to indicate that the signal SI1 or I2 is noise. Alternatively, if one of the detection signals DT0-DT2 is not the logic value of 0, the detector circuitry 140 outputs the noise indication signal SND having the logic value of 1, in order to indicate that the signal SI1 and SI2 are data.

The above descriptions are given with examples of using three clock signals PO-P2, but the present disclosure is not limited thereto. In different embodiments, the signal detector 100 may be configured to perform the related operations according to two or more clock signals.

Figure 4:
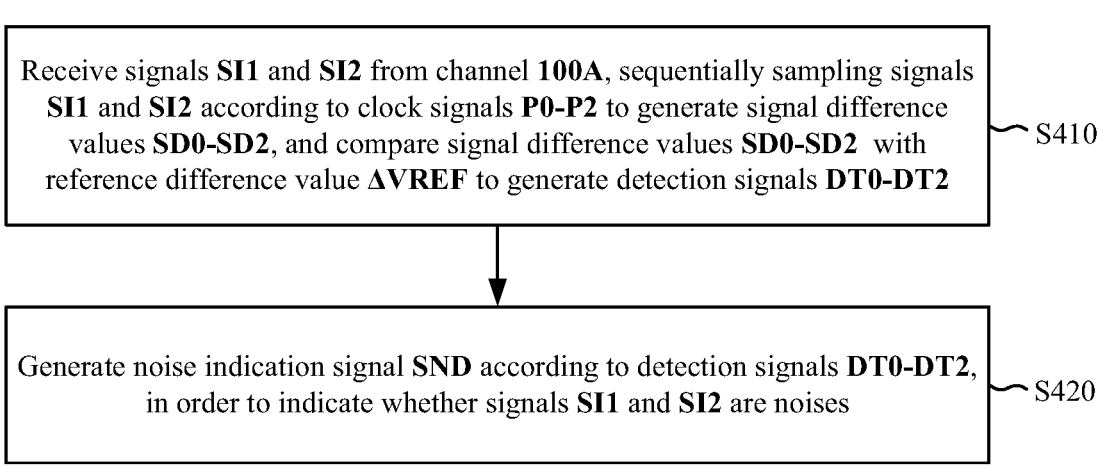
FIG. 4 is a flow chart of a signal detection method according to some embodiments of the present disclosure.

Reference is made to FIG. 4. FIG. 4 is a flow chart of a signal detection method 400 according to some embodiments of the present disclosure. For ease of understanding, the following descriptions are given with reference to the signal detector 100 in FIG. 1.

In operation S410, the signal SI1 and the signal SI2 are received from the channel 100A, the signal SI1 and the signal SI2 are sequentially sampled according to the clock signals P0-P2 to generate signal difference values SD0-SD2, and the signal difference values SD0-SD2 are compared with the reference difference value ΔVREF to generate the detection signals DT0-DT2.

In operation S420, the noise indication signal SND is generated according to the detection signals DT0-DT2, in order to indicate whether the signals SI1 and SI2 are noises.

The above operations can be understood with reference to the above descriptions of FIGS. 1-3, and thus the repetitious descriptions are not further given herein. The above description of the signal detection method 400 includes exemplary operations, but the operations of the signal detection method 400 are not necessarily performed in the order described above. The order of the operations of the signal detection method 400 can be changed, or the operations can be executed simultaneously or partially simultaneously as appropriate, in accordance with the spirit and scope of various embodiments of the present disclosure.

As described above, the signal detector and signal detection method of embodiments of the present disclosure are able to distinguish signals received from the channel by oversampling, in order to prevent signals from being determined as noises by mistake due to ISI.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A signal detector, comprising:
a plurality of oversampling circuitries configured to receive a first signal and a second signal from a channel, and to sample the first signal and the second signal according to a plurality of clock signals to sequentially generate a plurality of signal difference values, and to compare the plurality of signal difference values with a reference difference value, in order to generate a plurality of detection signals; and
a detector circuitry configured to generate a noise indication signal according to the plurality of detection signals, in order to indicate whether the first signal and the second signal are noises,
wherein the plurality of signal difference values correspond to differences between sampled first signals and sampled second signals.

2. The signal detector of claim 1, wherein each of the plurality of oversampling circuitries comprises:
a first sampling circuit configured to sample the first signal according to a corresponding clock signal of the plurality of clock signals, in order to generate a first signal value;
a second sampling circuit configured to sample the second signal according to the corresponding clock signal, in order to generate a second signal value;
an arithmetic circuit configured to calculate a difference value between the first signal value and the second signal value, in order to generate a corresponding signal difference value of the plurality of signal difference values; and
a comparator circuit configured to compare the corresponding signal difference value with the reference difference value, in order to generate a corresponding detection signal of the plurality of detection signals.

3. The signal detector of claim 1, wherein the detector circuitry comprises:
an OR gate circuit configured to generate the noise indication signal according to the plurality of detection signals.

4. The signal detector of claim 1, further comprising:
a plurality of synchronous output circuitries coupled to the plurality of oversampling circuitries respectively to receive the plurality of detection signals, and the plurality of synchronous output circuitries configured to output the plurality of detection signals to the detector circuitry according to a last clock signal of the plurality of clock signals.

5. The signal detector of claim 4, wherein each of the plurality of synchronous output circuitries comprises:
a D-type flip flop circuit configured to output a corresponding detection signal of the plurality of detection signals to the detector circuitry according to a falling edge of the last clock signal.

6. The signal detector of claim 1, wherein a plurality of phase differences are within the plurality of clock signals, and a total interval of the plurality of phase differences is less than or equal to a bit interval of the first signal or that of the second signal.

7. The signal detector of claim 6, wherein the plurality of oversampling circuitries are configured to sample the first signal and the second signal at least twice in the bit interval.

8. A signal detection method, comprising:
sampling a first signal and a second signal from a channel according to a plurality of clock signals to sequentially generate a plurality of signal difference values, wherein the plurality of signal difference values correspond to differences between sampled first signals and sampled second signals;
comparing the plurality of signal difference values with a reference difference value, in order to generate a plurality of detection signals; and
generating a noise indication signal according to the plurality of detection signals, in order to indicate whether the first signal and the second signal are noises.

9. The signal detection method of claim 8, wherein sequentially sampling the first signal and the second signal comprises:
sampling the first signal according to a corresponding clock signal of the plurality of clock signals, in order to generate a first signal value;
sampling the second signal according to the corresponding clock signal, in order to generate a second signal value;
calculating a difference value between the first signal value and the second signal value, in order to generate a corresponding signal difference value of the plurality of signal difference values; and
comparing the corresponding signal difference value with the reference difference value, in order to generate a corresponding detection signal of the plurality of detection signals.

10. The signal detection method of claim 8, wherein generating the noise indication signal comprises:
generating, by an OR gate circuit, the noise indication signal according to the plurality of detection signals.

11. The signal detection method of claim 8, further comprising:
outputting the plurality of detection signals according to a last clock signal of the plurality of clock signals.

12. The signal detection method of claim 11, wherein outputting the plurality of detection signals comprises:
outputting, by a D-type flip flop circuit, a corresponding detection signal of the plurality of detection signals according to a falling edge of the last clock signal.

13. The signal detection method of claim 8, wherein a plurality of phase differences are within the plurality of clock signals, and a total interval of the plurality of phase differences is less than or equal to a bit interval of the first signal or that of the second signal.

14. The signal detection method of claim 13, wherein the first signal and the second signal are sampled at least twice in the bit interval.

15. A signal detector, comprising:
a plurality of oversampling circuitries configured to receive a first signal and a second signal from a channel, and to sequentially sample the first signal and the second signal according to a plurality of clock signals to generate a plurality of signal difference values, and to compare the plurality of signal difference values with a reference difference value, in order to generate a plurality of detection signals;
a detector circuitry configured to generate a noise indication signal according to the plurality of detection signals, in order to indicate whether the first signal and the second signal are noises; and
a plurality of synchronous output circuitries coupled to the plurality of oversampling circuitries respectively to receive the plurality of detection signals, and the plurality of synchronous output circuitries configured to output the plurality of detection signals to the detector circuitry according to a last clock signal of the plurality of clock signals.

16. The signal detector of claim 15, wherein each of the plurality of oversampling circuitries comprises:
a first sampling circuit configured to sample the first signal according to a corresponding clock signal of the plurality of clock signals, in order to generate a first signal value;
a second sampling circuit configured to sample the second signal according to the corresponding clock signal, in order to generate a second signal value;
an arithmetic circuit configured to calculate a difference value between the first signal value and the second signal value, in order to generate a corresponding signal difference value of the plurality of signal difference values; and
a comparator circuit configured to compare the corresponding signal difference value with the reference difference value, in order to generate a corresponding detection signal of the plurality of detection signals.

17. The signal detector of claim 15, wherein the detector circuitry comprises:
an OR gate circuit configured to generate the noise indication signal according to the plurality of detection signals.

18. The signal detector of claim 15, wherein each of the plurality of synchronous output circuitries comprises:
a D-type flip flop circuit configured to output a corresponding detection signal of the plurality of detection signals to the detector circuitry according to a falling edge of the last clock signal.

19. The signal detector of claim 15, wherein a plurality of phase differences are within the plurality of clock signals, and a total interval of the plurality of phase differences is less than or equal to a bit interval of the first signal or that of the second signal.

20. The signal detector of claim 19, wherein the plurality of oversampling circuitries are configured to sample the first signal and the second signal at least twice in the bit interval.

* * * * *